Figure 1:
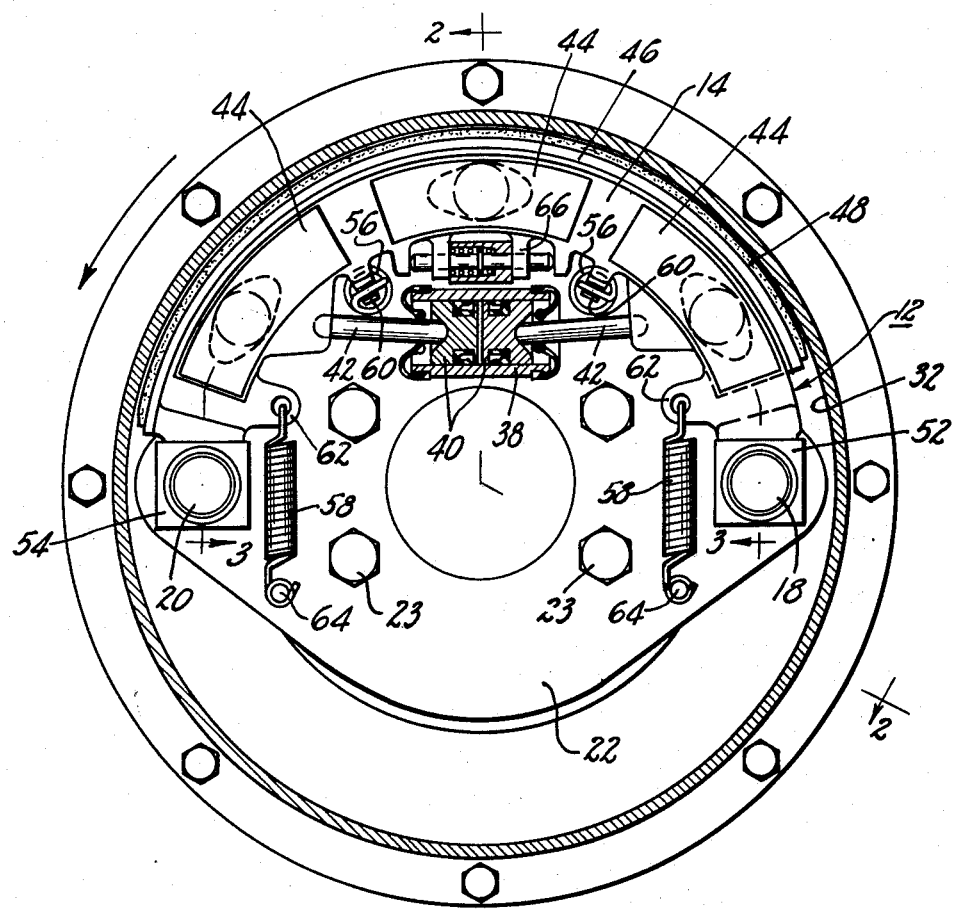

Oct. 25, 1960 R. T. BURNETT 2,957,550
BRAKE ASSEMBLY
Original Filed Dec. 5, 1952 2 Sheets-Sheet 1

INVENTOR.
RICHARD T. BURNETT
BY Cecil E Arens
ATTORNEY

Oct. 25, 1960    R. T. BURNETT    2,957,550
BRAKE ASSEMBLY
Original Filed Dec. 5, 1952    2 Sheets-Sheet 2
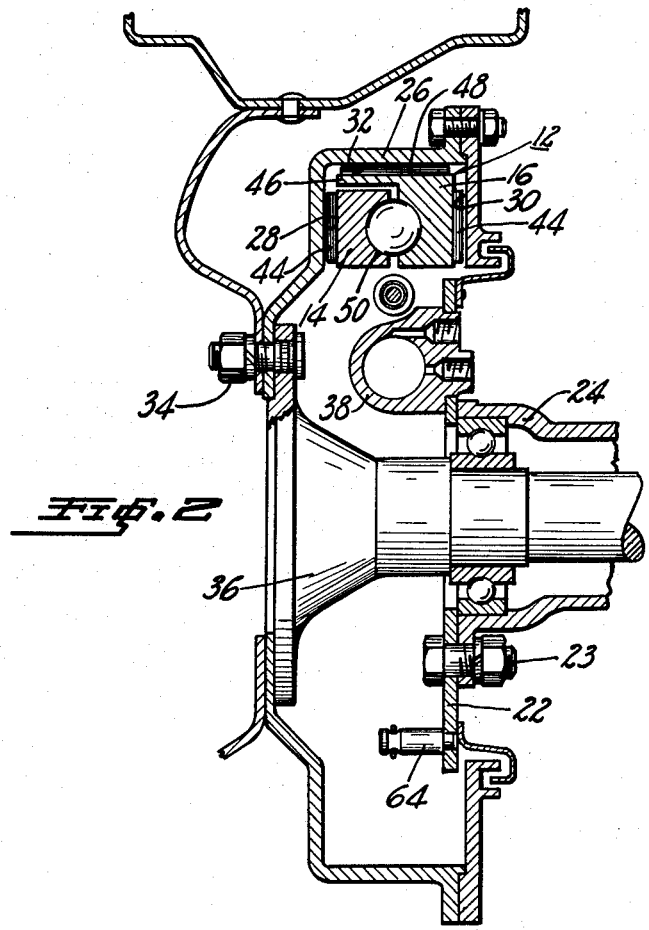
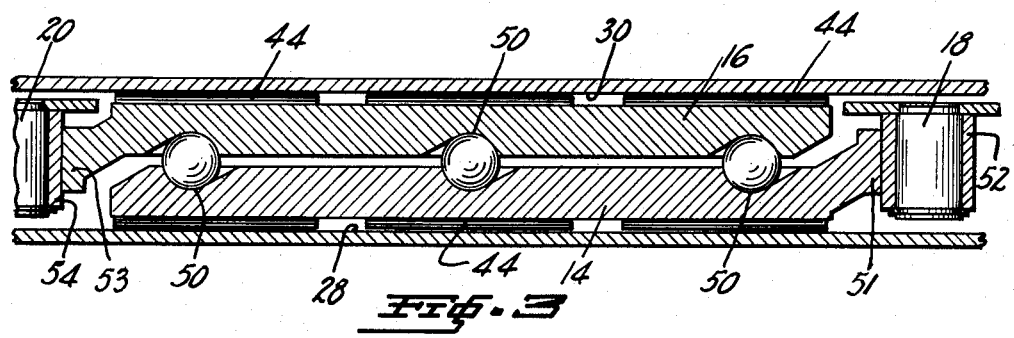
INVENTOR.
RICHARD T. BURNETT
BY Cecil J Arens
ATTORNEY United States Patent Office 2,957,550
Patented Oct. 25, 1960

2,957,550
BRAKE ASSEMBLY

Richard T. Burnett, South Bend, Ind., assignor to The Bendix Corporation, a corporation of Delaware Continuation of abandoned application Ser. No. 324,167, Dec. 5, 1952. This application July 18, 1956, Ser. No. 598,698

19 Claims. (Cl. 188—70)

This invention relates to a brake assembly having either or both of the following attributes: actuation of one friction means is effected by engagement of another friction means and/or a plurality of rotor surfaces are engaged by friction means associated with a nonrotatable stator.

This application is a continuation of U.S. application Serial No. 324,167, filed December 5, 1952, now abandoned.

An important object of this invention is to combine in a single brake assembly the best operating features of disc and drum (or shoe) brakes, obtaining the self-energization inherent in certain types of drum brakes, while avoiding the loss of pedal travel which results from drum expansion in conventional drum brakes.

Another important object of this invention is to obtain improved heat dissipation from the brake elements, with a consequent significant reduction of "fade" (i.e. loss of brake effectiveness). This is accomplished primarily as a result of an appreciable increase in the swept rotor area, obtained by utilizing both disc and cylindrical surfaces of the rotor.

The braking art has utilized among others two distinct types of brakes—the "drum" (or "shoe") brake, in which the surface of frictional engagement is cylindrical, and the "disc" brake, in which the surface of frictional engagement is normal to the axis of rotation. Each of these distinct types has characteristic advantages which have determined the particular type used in a given instance. But the choice of one of these types is usually at the cost of foregoing the advantages of the other. Generally, the desirable characteristics of the disc brake are: low pedal travel loss during the brake application; better heat dissipation with resultant reduction of the tendency to "fade," i.e. lose brake effectiveness; and simplification of the brake adjustment mechanism. On the other hand, the drum brake has the advantage of being able to provide greater self-energization, and therefore increased torque absorption for a given input effort. While this is a very generalized listing of the broad characteristics of the two different types of brakes it will be sufficient to emphasize the desirability of having the advantages of both types of braking effect in a single device. In addition part of the improvement of my brake operation stems from using a greater swept rotor area, that is, the area of the rotatable member contacted by friction elements is increased by using both cylindrical and disc surfaces of the same rotor.

The above and other objects and features of the invention will appear more fully hereinafter from a consideration of the following description, taken in connection with the following drawings, wherein an embodiment of the invention is illustrated by way of example. In the drawings:

Figure 1 is a side elevation of my improved brake assembly shown with a part of the rotor removed;
Figure 2 is a section taken on the line 2—2 of Figure 1, a part of the automobile wheel also being included to illustrate the mounting of the wheel; and
Figure 3 is a section taken on the line 3—3 of Figure 1.

A nonrotatable friction unit designated generally by reference numeral 12 consists broadly of a pair of axially-spaced elements 14 and 16 pivotally and slidably mounted at opposite ends on anchor members 18 and 20. The anchor members 18 and 20 are secured to a support member 22 which in turn is attached by a plurality of fastening members 23 to a nonrotatable member such as axle housing 24.

A rotor or rotatable member, designated generally by reference numeral 26 is formed with two axially-spaced disc or plane portions 28 and 30 joined by a substantially cylindrical portion 32. The rotor 26 is secured by a plurality of fastening members 34 to a rotatable hub 36.

The friction unit is initially actuated by a wheel cylinder 38 having oppositely acting piston members 40 operatively connected to the friction elements 14 and 16 by thrust links 42.

Each of the friction elements 14 and 16 is arcuate along its outer extremity in order to lie along the contour of the cylindrical portion 32. Those portions of the friction elements lying contiguous the disc portions 28 and 30 are plane or flat and are lined with friction material 44, for engagement with disc surfaces 28 and 30 of the rotor member 26. Element 16 is provided with a flange 46 extending along the arcuate length thereof and having friction material lining 48. The friction material lined flange 46 is adapted for engagement with the cylindrical surface 32 of the rotor.

Interposed between the elements 14 and 16 are a plurality of ball-ramp combinations 50, the ramp portions of the combinations 50 being recesses in the elements 14 and 16. These ball-ramp combinations 50 are camming devices suitably spaced apart along the length of the arcuate elements 14 and 16.

The elements 14 and 16 have enlarged ends 51 and 53 which abut against blocks 52 and 54 pivotally mounted on anchor members 18 and 20, the arcuate elements 14 and 16 being thereby pivotally and slidably associated with the anchors 52 and 54.

For yieldably retracting the friction unit 12 from an applied position I use two pairs of springs 56 and 58. The pair of springs 56 is fastened between ears 60 formed integrally with both of the elements 14 and 16. The springs 56 yieldably urge the elements 14 and 16 together, thereby axially retracting the friction pads 44 on both of the elements from disc portions 28 and 30 of the rotor. Return springs 58 are connected at one end to ears 62, located adjacent the pivotal mounting portion of the elements 14 and 16, and at the other end to axially extending posts 64 which are secured to the support member. The return springs 58 serve to retain the ends of elements 14 and 16 against the anchor blocks 52 and 54.

Automatic adjusting means such as member 66 may be included for maintaining a constant clearance of friction pads 44 from the disc portions 28 and 30. This clearance, once established, will be maintained throughout the wear life of the friction pads 44. The specific construction of the adjusting means does not form a part of the present invention, and is included only to illustrate the possibility of its use.

In operation, fluid pressure from a master cylinder source, not shown, will be transmitted to the wheel cylinder 38 thereby oppositely actuating piston members 40 which are reciprocably mounted therein. Actuation of piston members 40 produces relatively opposite circumferential motion between elements 14 and 16. This relatively opposite circumferential movement of the elements is translated into an opposite axial thrust on both of said elements by the camming devices 50 so that friction pads 44 are applied against disc portions 28 and 30. Relative circumferential elements of the two members 14 and 16 causes the balls to mount the ramp portions which then impart an axial spreading force thereon.

Assuming counterclockwise rotation of the rotor 26 as indicated by the arrow in Figure 1, when the two elements are axially spread by the camming devices, the member 14 will leave anchor block 52 and both elements 14 and 16 will anchor as a unit on block 54 as a result of engagement of the friction pad 44 with disc surfaces 28 and 30. Element 14 is free to continue circumferential movement relative to member 16, this movement being induced by engagement of friction pad 44 with disc portion 28 of the rotor 26. Further circumferential movement of element 14 relative to element 16 causes increased axial spreading of the pads 44 against disc portions 28 and 30 through the action of the camming device 50.

The two elements 14 and 16 acting as a unit are pivoted about anchor 20 by torque reaction from engagement of the pads 44 with the disc portions 28 and 30, thus radially outwardly applying the friction material lined flange 46 against the cylindrical surface 32.

In the reverse direction of rotation, the two elements 14 and 16 are moved in the opposite direction anchoring as a unit on anchor block 52, element 14 being anchored and element 16 being free to continue relative circumferential movement induced by engagement with surface 30. Referring to Figure 3, element 16 leaves anchor block 54 and moves to the right relative to element 14. This relative circumferential motion of the members produces an axial thrust applying pads 44 of the elements 14 and 16 against disc portions 28 and 30 of the rotating member by reason of the camming devices 50. Engagement of pads 44 produces pivotal movement of both elements as a unit on anchor block 52, thereby applying the "shoe" portion 46 against the cylindrical surface 32.

The series of operations encountered for braking in either direction of rotation is: (a) opposite circumferential actuation of elements 14 and 16 by the wheel cylinder 38, (b) axial spreading of the elements by the camming devices 50, (c) torque reaction from engagement of the friction pads 44 causing pivotal actuation of both elements as a unit to radially outwardly apply the lined flange 46.

When the pressure in the wheel cylinders is relieved, the springs 56 disengage the friction pads 44 from disc surfaces 28 and 30, the relative circumferential movement of the elements being opposite to that produced by the wheel cylinder, thus causing the balls to descend the ramps. Referring to Figure 1, it will be seen that the purpose of the pair of springs 58 associated with the elements 14 and 16 is to retain the ends of the elements in abutting relation with anchor blocks 52 and 54.

It will be apparent from the foregoing description that my novel brake assembly is adapted to accomplish the objects hereinbefore enumerated. By using a large swept rotor area the heat generated from kinetic energy absorbed is more readily dissipated; therefore, loss of brake effectiveness is reduced to a minimum. By using roller-ramp combinations and having one of the friction elements of the "shoe" type, I have obtained an appreciable self-energization factor.

Although only one embodiment of my invention has been described, it will be understood by those skilled in the art that the objects of the invention may be obtained by the use of constructions different in certain respects from that disclosed without departing from the underlying principles of the invention.

I claim:

1. For use in a brake having a rotatable member, a support member, and anchoring means carried by said support member; a composite disc and shoe device pivotally combined with said anchoring means, said composite device including oppositely acting disk friction means having parallel friction-engaging surfaces located in spaced apart opposed relation and an arcuate shoe friction means having its friction surface disposed perpendicular to the friction surfaces of said disk friction means, said disk and shoe friction means being pivoted about said anchoring means, and means for operating said composite device producing engagement of the friction-engaging surfaces thereof with said rotatable member.

2. In combination with a rotatable substantially U-shaped cross section member having opposed substantially flat friction surfaces joined by a cylindrical braking surface, a brake comprising a support, a pair of spaced anchors carried on said support, a composite disc and shoe brake unit including a pair of arcuate axially spaced elements, means for pivotally mounting said elements on a respective one of said anchors, said elements having oppositely facing sides equipped with friction material lining adapted for engagement with the axially spaced sides of said rotatable member, one of said elements having an arcuate friction-material-lined flange disposed transversely with respect to the sides of said one element and extending along the outer arcuate length of said one element, said friction-material-lined flange being engageable with the cylindrical surface of said rotatable member, means for producing relative circumferential actuation between said elements, and a plurality of ball-ramp combinations interposed between said elements for axially applying the friction material lined sides of said elements against the substantially flat surfaces of said rotor as they are rotated about either of said anchors.

3. A brake comprising a rotatable member having three friction element engaging surfaces, a fixed support member, a pair of spaced anchor means on said support member, a composite disk and shoe brake unit including a pair of axially-spaced disk elements having oppositely-facing friction surfaces engageable with two of the surfaces of said rotatable member, each of said disk elements being mounted on one of said anchor means for pivotal movement on an axis parallel to the axis of said rotatable member, one of said disk elements having a transverse arcuate flange providing a shoe friction element engageable with the third surface of said rotatable member, a plurality of camming devices interposed between said disk elements for moving said elements axially responsively to relative movement between said elements in the direction of rotation of said rotor, and actuating means operatively combined with said disk elements to produce said relative movement therebetween.

4. For use in cooperation with a rotor having three friction element engaging surfaces, a brake comprising a support, a pair of spaced anchoring means on said support, a combination disk and shoe friction unit including two disk elements having spreadable oppositely-facing parallel friction surfaces, one of said elements having an arcuate friction-material-lined flange disposed laterally intermediate the friction surfaces of said two disk elements and transversely to the side of said one element and extending contiguously to the other of said elements, said friction material lined flange being radially movable into frictional engagement with one of the engaging surfaces of said rotor, hydraulic actuating means having oppositely-acting pistons operatively associated with said elements and adapted to produce relative movement of said elements in their respective parallel planes and in the direction of rotation of said rotor, a plurality of camming devices interposed between said elements and connected thereto to spread said elements upon said relative movement therebetween, means for yieldably urging the disk elements to retracted position, and means for automatically adjusting the relative displacement of said disk elements responsively to wear of their friction surfaces.

5. In a brake, first friction means including a first disk friction element and an integral shoe friction element disposed transversely to said disk element, second friction means including a second disk friction element substantially parallel and located closely adjacent to said first disk friction element and in side-by-side relation therewith, and a plurality of camming devices interposed between said first and second friction means to separate said means responsively to relative movement between said first and second means along an arcuate line connecting the ends of said disk friction elements.

6. A brake comprising a U-shaped cross section rotor, a support member, anchoring means secured to said support member, a friction unit pivotally combined with said anchoring means, said friction unit including an arcuate brake element disposed adjacent one of the surfaces of said rotor for engagement therewith and a pair of disk brake elements having oppositely-facing parallel surfaces engageable with the axially spaced surfaces of said rotor, engagement of said disk brake elements effecting pivotal movement of said unit on said anchoring means to provide radial application of said shoe brake element against its opposed surface of said rotor, said disk and shoe elements being anchored together on said anchoring means which defines the center of pivotal movement thereof, and a plurality of spaced camming means disposed between said disk brake elements to force said disk elements apart responsively to their movement circumferentially of each other whereby self-energizing braking action is effected.

7. In a brake, a rotatable member provided with two plane and one cylindrical braking surfaces, a support member, anchoring means on said support member, a friction unit, means for mounting said friction unit on said anchoring means and providing pivotal movement thereon, said friction unit being disposed between the plane surfaces of said rotatable member and having two oppositely-facing parallel friction elements movable respectively into engagement with said plane surfaces and a third friction element disposed offset but between said two friction elements to be in transverse relation thereto, said third friction element being joined with said two friction elements for engagement with said cylindrical surface upon pivotal movement of said unit on its anchoring means defining the center of pivotal movement for said friction elements and located to receive the anchoring thrust of said entire friction unit.

8. In a brake, a rotatable member provided with two plane and one cylindrical braking surfaces, a support member, anchoring means on said support member, a friction unit having oppositely facing parallel friction elements one or the other of which is anchored on said ancohoring means in each direction of braking and permitting the other element to move relatively thereto, energizing means disposed between said oppositely facing friction elements to effect spreading movement thereon in opposite directions responsively to said relative movement and to then engage with said plane surfaces of the rotatable member, a third friction element of said unit constructed transversely to said parallel friction elements and having an arcuately shaped friction surface, said third friction element being joined with one or the other of said parallel friction elements and forming a friction surface in a plane mutually perpendicular to the planes of said parallel friction elements, and means for initiating brake application by effecting engagement of said third friction element with its opposed cylindrical braking surface.

9. In a brake, a brake device comprising two spaced apart friction elements having substantially flat disk friction surfaces, a transverse flange constructed integrally with one of said friction elements to provide a curvilinear friction surface disposed beyond said flat disk friction surfaces but within the lateral space separating the planes of said two friction elements, and a plurality of camming devices located intermediate said two friction elements to effect spreading movement thereon as one of the friction elements is displaced circumferentially relatively to the other friction element.

10. A kinetic energy absorbing device comprising relatively rotatable first and second friction means, said first friction means including a member having annular spaced-apart parallel surfaces combined with a substantially cylindrical surface, said second friction means including first friction elements having oppositely-facing parallel friction-engaging surfaces arranged in juxtaposition to said spaced-apart parallel surfaces of said first friction means and an arcuate second friction element having its friction-engaging surface disposed perpendicularly to the surfaces of said first friction elements and juxtaposed to said cylindrical surface, means for supporting said arcuate second friction element laterally intermediate said first friction elements, actuating means for initiating brake application by engagement of said arcuate second friction element and its opposed cylindrical surface, and energizing elements disposed between said first friction elements to thrust them apart upon relative arcuate movement therebetween to provide self-energizing braking action.

11. A brake comprising a friction member having disk and cylindrical surfaces of engagement, a support member, anchoring means carried by said support member, a composite disk and shoe brake unit combined with said anchoring means, operator-controlled actuating means for initiating brake application by effecting frictional engagement between the cylindrical surface of said member and the shoe portion of said unit, said unit including a pair of axially-spaced elements having oppositely-facing friction surfaces, each of said oppositely-facing friction surfaces being engageable with its opposed disk surface provided by said friction member, and camming means interposed between said axially-spaced elements to displace said elements upon relative circumferential movement therebetween, one of said elements having a transverse flange defining said shoe friction element engageable with said cylindrical surface of engagement of said friction member, one or the other of said axially-spaced elements being held by said anchoring means in each direction of rotation with the other of said elements being relatively circumferentially movable to provide self-energizing braking action.

12. A brake device comprising a support member, a pair anchors on said support member, means for mounting said unit at the opposite ends thereof on a respective one of said anchors, a composite disk and shoe brake unit, said unit including a pair of spreadable arcuate disk elements having oppositely-facing friction surfaces located in parallel planes and each being circumferentially movable while the other is held fixed at the end thereof associated with a respective anchor, means interposed between said arcuate disk elements for spreading them in response to relative movement between said elements along an arcuate line interconnecting the ends of said elements, a shoe element carried by one of said elements laterally intermediate the friction surfaces of said disk elements and having its surface substantially perpendicular to the friction surfaces of said elements, actuating means connected with said arcuate disk elements to produce said relative movement between said elements, and means retracting said brake unit from an applied position.

13. For use in cooperation wtih a rotor having three friction element engaging surfaces, a brake comprising a support, a pair of spaced anchoring means, and a composite disk and shoe brake unit including a pair of disk elements having oppositely-facing parallel friction surfaces, means for mounting said disk elements and providing for pivotal movement at the ends of said disk elements on a respective one of said anchoring means, one of said elements having an arcuate friction-material-lined flange disposed perpendicular to the friction surfaces of said disk elements and extending contiguously to said elements to be laterally intermediate the friction surfaces of said disk elements, hydraulic actuating means having a pair of oppositely-acting pistons connected with said elements to produce relative circumferential movement of said elements in their respective planes, and a plurality of camming devices interposed between said disk elements and adapted to spread said disk elements responsively to relative movement between said elements.

14. A kinetic energy absorbing device comprising relatively rotatable first and second friction means, said first friction means including a member having annular spaced-apart parallel surfaces and a substantially cylindrical surface, said second friction means including first friction elements having oppositely-facing and oppositely-acting parallel friction surfaces disposed in juxtaposition to said spaced-apart parallel surfaces of said first friction means and a curvilinear second friction element constructed as a transverse flange integral with one of said elements and located in a plane perpendicular to the planes containing said parallel friction engaging surfaces of said first friction elements, anchoring means for engaging one or the other of said first friction elements in each direction of braking to prevent its rotation relatively thereto, the other of said friction elements being disengaged from said anchoring means to provide relative circumferential movement between said first friction elements, energizing means for effecting spreading movement between said first friction elements upon their relative circumferential movement to provide self-energizing braking action, and actuating means for initiating brake application effecting frictional engagement between the substantially cylindrical surface of said first friction means and the opposing curvilinear friction surface of said second friction element.

15. A kinetic energy absorbing device in accordance with claim 14 including yielding return means comprising springs secured to said first friction elements to position them in a normal location relatively to each other disengaging the frictional surfaces thereof from their opposed annular surfaces of said first friction means, and wherein said energizing means comprises a plurality of balls and ramps constructed integrally within said first friction elements to force said elements apart responsively to their relative movement.

16. A brake comprising a fixed support member, a rotor, a pair of anchors on said support member, a friction unit pivotally combined with said anchors, one or the other of said anchors providing the sole anchoring resistance for the entire unit during braking in each direction of rotor rotation, a disk element of said unit arranged to engage said rotor and trace a composite circumferential and radial path thereon, a second friction element of said unit radially applied against said rotor by torque developed from application of said disk element with said rotor, and actuating means connected with said friction unit to initiate brake application effecting frictional engagement of said second friction element with said rotor.

17. A kinetic energy absorbing device comprising relatively rotatable first and second friction means, said first friction means including annular substantially flat spaced-apart parallel surfaces and an intermediate curvilinear surface, said second friction means including separable relatively movable friction elements having oppositely-facing parallel friction surfaces arranged in juxtaposition to said spaced-apart parallel surfaces of said first friction means and a curvilinear friction element having a friction surface located in juxtaposition to the curvilinear surface of said first friction means and disposed laterally intermediate the oppositely facing parallel surfaces of said relatively movable friction elements and in adjacent perpendicular relation therewith, anchoring means for said second friction means for retaining only one of said friction element against movement and providing relative circumferential movement of the other of said elements in each direction of circumferential braking, relatively nonrotatable actuating means for initiating brake application by effecting frictional engagement between said curvilinear friction element and its juxtaposed curvilinear surface, and energizing means spaced between said separable friction elements to develop spreading action therebetween and effecting self-energizing thrust of the parallel surfaces of said friction elements against the opposing adjoining surfaces of said first friction means.

18. The kinetic energy absorbing device in accordance with claim 17 wherein said curvilinear friction element is formed as a flange constructed transversely to one of said friction elements having oppositely facing friction surfaces.

19. The kinetic energy absorbing device in accordance with claim 17 wherein said energizing means comprises a plurality of rolling means having associated inclined seats.

References Cited in the file of this patent

UNITED STATES PATENTS

| | | |
|---|---|---|
| 1,603,963 | Liebowitz | Oct. 19, 1926 |
| 1,928,630 | Penrose | Oct. 3, 1933 |
| 1,933,079 | Sneed | Oct. 31, 1933 |
| 1,956,315 | Collins | Apr. 24, 1934 |
| 2,050,902 | Tatter | Aug. 11, 1936 |
| 2,057,422 | Dickson | Oct. 13, 1936 |
| 2,065,382 | Levy | Dec. 22, 1936 |
| 2,086,538 | Dabney | July 13, 1937 |
| 2,307,652 | Whitten | Jan. 5, 1943 |
| 2,344,933 | Lambert | Mar. 21, 1944 |
| 2,352,222 | Pogue et al. | June 27, 1944 |
| 2,359,788 | Pierce | Oct. 10, 1944 |
| 2,371,503 | Carter | Mar. 13, 1945 |
| 2,481,120 | Juel et al. | Sept. 6, 1949 |
| 2,602,525 | Jurgens | July 8, 1952 |
| 2,607,442 | Lucker et al. | Aug. 19, 1952 |
| 2,629,473 | Vincent | Feb. 24, 1953 |
| 2,701,626 | Walther | Feb. 8, 1955 |
| 2,732,036 | Myers | Jan. 24, 1956 |
| 2,751,046 | Tack | June 19, 1956 |

FOREIGN PATENTS

| | | |
|---|---|---|
| 707,074 | Germany | June 12, 1941 |
| 543,905 | Great Britain | Mar. 18, 1942 |

UNITED STATES PATENT OFFICE
CERTIFICATE OF CORRECTION

Patent No. 2,957,550　　　　　　　　　　　　　　　October 25, 1960

Richard T. Burnett

It is hereby certified that error appears in the above numbered patent requiring correction and that the said Letters Patent should read as corrected below.

Column 5, line 42, after "means" insert -- , said anchoring means --; column 7, line 32, for "yielding" read -- yieldable --.

Signed and sealed this 29th day of May 1962.

(SEAL)
Attest:

ERNEST W. SWIDER
Attesting Officer

DAVID L. LADD
Commissioner of Patents